Patented Sept. 13, 1938

2,129,841

UNITED STATES PATENT OFFICE 2,129,841

COLORED SILICATE COATING

Carl E. Hillers, Charlottesville, Va., assignor to Blue Ridge Slate Corporation, Charlottesville, Va., a corporation of Virginia No Drawing. Application March 21, 1935, Serial No. 12,255

8 Claims. (Cl. 91—70)

This invention relates to new and useful improvements in colored silicate coatings on refractory granular material.

The object of the present invention is to prevent or to diminish the tendency of such coatings to bloom. Blooming is a characteristic defect of many types of coatings produced from sodium silicate, and I accomplish my object by incorporating boric acid or boric oxide with the sodium silicate in the coating of the granules, thus producing under proper heating conditions a marked reduction in carbonate blooming tendency. Furthermore, the water solubility of my coatings is materially reduced as compared to ordinary silicate coatings.

Granules coated in accordance with the present invention may be used as a surfacing for asphalt shingles and for other decorative or ornamental purposes.

In the following discussion the term "sodium silicate" usually designates an aqueous solution of specific gravity 1.40 to 1.43 of the neutral silicate of commerce which is composed of $Na_2O$ and $SiO_2$ in the molar ratio of approximately 1 to 3.25, and contains about 38 to 39 per cent of solids, i. e., non-volatile.

One theory which has been advanced to explain the efflorescing tendency of the usual sodium silicate granule coatings is that the $SiO_2$ portion of the coating is so weakly acidic that it allows sodium hydroxide to form by hydrolysis which then combines with the carbon dioxide of the atmosphere. According to another theory, carbon dioxide (or carbonic acid) is more strongly acidic than silicon dioxide (or silicic acid), and in the presence of moisture the carbon dioxide displaces the silicon dioxide from combination with the sodium oxide or hydroxide.

Without accepting or rejecting these theories, I find that the presence of carbon dioxide in efflorescence can usually be demonstrated quite easily by treating it with a drop of hydrochloric acid.

The absorption of atmospheric carbon dioxide by sodium silicate could be prevented by the addition of the proper amounts of acids stronger than carbonic acid. However, upon the addition of even the weakest acids to sodium silicate, either precipitation or gelling usually occurs. This applies also to boric acid. If boric acid in dilute solution is added to sodium silicate at room temperature, there is no apparent immediate action, though gelling may occur later, but the quantity of water required to introduce an appreciable amount of boric acid in this way so dilutes the sodium silicate that it loses its adhesive quality. If a saturated solution of boric acid is added, precipitation occurs and, due to dilution, the sodium silicate loses much of its adhesive quality. As the addition is continued, and sometimes merely upon standing, gell formation takes place. Granules coated with such gells will not make a satisfactory commercial product unless they are processed at high temperatures, preferably around the flux point of the coating.

On account of the limited solubility of boric acid in water, even a saturated solution would add excessive water to the sodium silicate. Granules, unless very porous, when coated with dilute sodium silicate will usually show poor color development.

If dry, powdered boric acid in the amount of 0.5 to 1.0 grams be added to ten grams of sodium silicate, precipitation occurs immediately. Owing to this well known phenomenon, these substances are generally considered as incompatible. If stirred, the mixture becomes full of gritty lumps and may even assume a solid form. Such mixtures cannot be uniformly distributed over the surfaces of refractory granules.

I have found, however, that by causing this reaction to take place on the surfaces of refractory granules, and subsequently heating the granules, uniformly coated granules will be produced which have excellent qualities as far as bloom and weather resistance, water insolubility and adhesiveness to asphalt shingles or the like are concerned, particularly where coloring material is incorporated in the coating.

The colored coatings on such granules undergo certain color changes during the heating process. They lose water and the boric acid undoubtedly passes through the stages of metaboric acid, tetraboric acid, etc. I consider 600° F. approximately the lower heating limit required for weather resistance in such coatings when applied to most granular bases. The colors are clean and bright. As the temperature of the heat treatment is raised the color progressively lightens, and will be lightest at 1200–1250° F. The color will darken as the temperature is increased to 1300–1350° F. and even up to 1500° F. in some cases. At higher temperatures, up to 1800–1900° F. the color will again lighten. Of course, the above mentioned temperatures are the maximum attained during the heat treatment, and these color variations are observed only after the cooling of the granules.

The melting point of boric acid is about 365° F. The starting material, orthoboric acid, loses water of constitution at 212° F. and changes progressively at higher temperatures, ultimately yielding boric oxide. Orthoboric acid, as well as the intermediate heat products up to and including boric oxide, are all quite soluble in hot water. Granule coatings comprising only boric oxide or boric acid, unless heated to fairly high temperatures, have little or no weather resistance and are easily dissolved in hot water.

Sodium silicate coated granules are also soluble in hot water in inverse ratio, roughly, to the temperature of their heat treatment.

Refractory granules coated with sodium silicate and boric acid together not only bloom less and much more slowly, but are much less soluble upon protracted extraction in hot water than like granules coated with sodium silicate.

In practicing my process, I proceed to mix the ingredients in one of a number of different ways, three of which I shall now describe on a laboratory scale, using small quantities of materials, a small container and a wooden stick for stirring. In all three methods I shall use the same formula, consisting of granular mineral material such as

| | Grams |
|---|---|
| Slate | 100 |
| Chrome oxide | 0.75 |
| Dry, powdered boric acid | 0.25 |
| Sodium silicate | 5.0 |

Mixing methods (A) Pour the granular slate into the container and add the boric acid. Stir thoroughly for, say, two minutes. Then add the chrome oxide and stir for about ½ minute. Then add the sodium silicate and stir vigorously for about ½ minute. Proceed to heating treatment.

(B) Pour the granular slate, the chrome oxide and the sodium silicate together into the container and stir for from ½ minute to 3 minutes or longer (or, alternatively, mix the chrome oxides and the sodium silicate into a roughly dispersed paint, add this to the slate granules and stir for from ½ minute to 3 minutes or longer). Then add the powdered boric acid and stir vigorously for ½ minute. Proceed to heating treatment.

(C) First stir together for about 1 minute the sodium silicate and the chrome oxide in the mixing container (or in a separate container) to produce a roughly dispersed paint. Then combine this paint, the slate granules, add the powdered boric acid in the mixing container, and stir vigorously for ½ minute. Proceed to heating treatment.

In practice, method C occurs usually as a combination of methods A and B wherein some of the individual granules are first coated with sodium silicate and subsequently coated with boric acid and other individual granules are first coated with boric acid and then with sodium silicates.

In the examples illustrating the type of mixing procedure I use, several variations and modifications are shown, but in all three methods the length of time the sodium silicate and powdered boric acid are mixed together on the granules is one-half minute. This is an important feature of my process, because too short a mixing time results in incomplete distribution of the boric acid in the sodium silicate, whereas too long or too much mixing results in scraping the wet coagulated colored coating off some of the surfaces of certain percentage of the granules. Should the latter occur, bare or uncolored surfaces will appear in the granules after the heat treatment, reducing their attractiveness, or at least the uniformity of their color effect, and this is usually undesirable. Although I have specified one-half minute in the examples, I do not wish to limit my process in its application to that exact time, since I find that the length of time is also related to the vigorousness and efficiency of the mixing equipment.

In production, I find that from 30 seconds to 45 seconds mixing in a Stedman mixer (2 ton capacity) charged with one ton of granules, driven at 7½ revolutions per minute produces the desired coating. The 30 to 45 seconds of mixing refer only to the stage where the sodium silicate and the powdered boric acid are being mixed on the granules, and not to the total mixing time, which may vary considerably depending upon the method employed and the order in which the various ingredients are added. Although I have shown three methods for mixing, it will be evident to one versed in the art that other variations are possible; consequently I do not wish to limit myself to any mixing method or mixing devices or any maximum or minimum amount of time employed therein, for I consider that my invention covers broadly all processes of manipulation substantially equivalent to the treatment described.

It will also be evident that one mixing method may be better adapted than others to granules of a certain nature, and that the method best adapted to one kind of granules need not necessarily be best adapted to all kinds of granules, and, further, that two or more of the methods given may produce approximately equal results on one kind of granules. On account of variations in any one type of stone (or type of brick, or slag or specific minerals, etc.) depending upon geographic occurrence, method of crushing, etc., it is quite impossible here to lay down hard and fast rules for the particular mixing method or modification thereof best adapted to each kind of refractory granular base, but from my experience I know that at least one of the methods will produce well coated granules by my process on any refractory granular base.

Other methods of combining sodium silicate and boric acid may also be practicable. A solution of boric acid may, for instance, be applied to the base and then dried before the application of the sodium silicate. In such cases the boric acid should be dry or nearly dry when the sodium silicate is applied.

My process could be applied to hot slag or other heated granules by first diluting the sodium silicate with sufficient water to allow the granules to be quenched and cooled thereby, while still maintaining some of the sodium silicate on the surface moist, and then rapidly mixing on the boric acid. Other methods will occur to those skilled in the art. Coloring matter may be added along with the sodium silicate or later, as desired.

Heat treatment

Pour the wet mixed granules mixed in accordance with methods A, B, or C into a metal dish (or tray) or the like. Preferably the tray should be hot. Transfer to a furnace, and stir occasionally with a long metal handled, wide, single-toothed rake to prevent caking of the granules during the early stages of the heating. The furnace is preferably heated to a temperature slightly higher than desired before introducing the tray of granules, so that the granules will quickly come to the desired temperature, and thus the total heating period need not exceed ten minutes. Usually only five to seven minutes are required. At the end of the heating period, remove the tray of granules from the furnace and allow the granules to cool, either in the tray in air, or by cooling the bottom of the tray in water, or by pouring from the tray to an air-cooled or water-cooled surface of metal or stone. If desired, water may be sprinkled on the hot granules to assist in cooling, but the amount of water thus used should not be excessive. Otherwise the granules will be wet when cooled and will have to be dried afterwards.

The temperatures I employ during the heating treatment depend upon the color desired in the final product. If the slate granules mixed as in A, B or C be heated for five minutes at a temperature between 600° F. and 1200° F., the color of the cooled granules will be of a pleasing yellowish-green or bluish-green shade. Temperatures below 1000° F. tend to produce the yellowish-green colors, being more intense at the lower temperatures and gradually changing to the bluish-green at the higher temperatures. Thus, by controlling the temperature, (all other factors being equal) the color may be maintained quite uniform, or various colors may be produced from the same formula simply by establishing different temperatures for the heat treatment.

If the temperature employed during the heat treatment exceeds about 1250° F., further changes in color occur, tending to darken the shade of green of the product as the temperature is raised. In my heating equipment, wherein the pyrometer tip is located about one inch above the surface of the granules in the tray, this darkening of shade appears noticeable about 1280° F. and becomes more pronounced at higher temperatures, such as 1400° F. or 1500° F. Above this temperature, the hot granules assume a sticky condition noticeable if raked, and melting of the coating occurs. When a granular base such as sand is used, this molten coating assumes a condition of sticky fluidity or sloughing, and if the temperature is further raised above 1600°-1750° F., the fluidity may gradually diminish and the heated granules may show a tendency to become crusty. Upon cooling, such granules may be light in color and more desirable for some uses than either the granules prepared by heating in the ranges 600° to 1200° F. or 1200° to 1600° F.

In heat treating on a manufacturing scale granules coated and colored as above described, I may use an inclined rotary kiln for a continuous process, or other types of heating devices if "batch heating" is preferred. I do not wish to limit my process to any particular heating device. I prefer, however, that the heat treating devices be so designed and operated as to provide either exposure of the granules to heat in thin layers or agitition or rotation to insure uniform heating. Cohesion between the coated granules while wet is not an obstacle that must be overcome mechanically, since granular material coated in accordance with my invention as distinguished from "silicate granules" has less tendency to ball up or form lumps during the early stages of the heating process.

I do not wish to limit my process to specific temperatures. The temperatures employed should not be sufficiently high completely to fuse the granular base material. Although on most mineral material of natural origin, a temperature of at least 600° F. is necessary in my process to produce colored coated granules with good weathering properties, there are certain blast furnace slags which may produce colored coated granular material with good weathering properties in my process at temperatures below 600° F. during the heat treatment, and I find that such granules possess less tendency to effloresce than if made in accordance with other methods.

Although in the mixing examples, I have described slate as the granular base material, I do not wish to restrict the application of my process to slate. I find it is adaptable to many other granular bases of a refractory character, whether of mineral or ceramic origin. For some of the applications of my coated granules, I find other bases are even better suited than slate. For example, I may use this coating in coloring dust-free sand to be used in children's play boxes, for, when colored, it provides an attractive material of greater insolubility in water than ordinary silicate coated granules, and is free from any dangerous or harmful ingredients, such as uncombined lead compounds, etc., which may occur in some types of glass-coated granules. The granules are quite free from dust.

Other granular refractory bases which I have employed include feldspar, sandstone, limestone, traprock, shale, quartzite, brick, broken glass, greenstone, granite, slag, quartz, basalt and diabase, and I find that practically any refractory rock can be color-coated by my process, although all bases are not suitable for producing the same color. The choice of base provides further variations in color effects from the same formula, and unless the granular base tends too greatly to disintegrate or in other ways to change during the mixing or heat treatment or afterwards, nearly any base, within reason, may be used to produce colored granular material of commercial value by my process.

Some slates are too greatly changed by heating above 1500° F. to have color appeal, but even these I find can be greatly improved in color, using the same total amount of coloring principle by a double coating and double heating operation. The heat treatment employed on the first coating need not be above 1100° F. to provide greater resistances in the second coat to heating in the 1500° F. and above temperature range. Certain "greenstone," granite, limestone and traprock bases likewise are not suited for heating above 1000° F. when attempting to produce some colors because of color changes in the base material or for other reasons, but the colors produced by heating to temperatures at which the rock is stable, may be very desirable.

In the preceding examples, I have used powdered boric acid and sodium silicate in the proportions of 5 lbs. of the former and 100 lbs. of the latter per ton of granules. I have found that the proportion of materials may not vary greatly in my process, if the desired results are to be obtained. This is especially true if the subsequent heating treatment of the coated granules is conducted below the fluxing point of the coating. To produce boric acid-sodium silicate coated granules which are substantially free from the tendency to form a carbonate bloom, three or four percent of boric acid on the weight of the sodium silicate per ton of granules is necessary. Smaller amounts exert a correspondingly smaller effect.

More than ten percent of boric acid appears to alter the relationship necessary between boric acid and sodium silicate for good weather resisting colored granules, and I have not found higher boric acid percentages of any particular value in my process, regardless of the temperature employed. However, since the amount of sodium silicate used per ton of granules may be varied, depending upon the kind of granular base used, the shape, porosity, and size of the individual granules and whether one or two or more coats be applied thereto, etc., I prefer to express the relationship, not in terms of pounds or percentages of boric acid per ton of granular material, but in terms of the percentage of powdered boric acid used, based on the weight of sodium silicate employed. This relationship, calculating boric acid as 56.4% non-volatile, and sodium silicate as being approximately 40% non-volatile, and comprising one part $Na_2O$ to 3.25 parts of $SiO_2$ is as follows:

*Percent by weight*

|  | $B_2O_3$ | $Na_2O$ | $SiO_2$ |
|---|---|---|---|
|  | Percent | Percent | Percent |
| Minimum | 4.23 | 24 | 76 |
| Maximum | 14.10 | 24 | 76 |

The minimum percent of $B_2O_3$ (4.23) is equivalent to 3 lbs. of powdered boric acid per 100 lbs. of sodium silicate, and the maximum (14.10) is equivalent to 10 lbs. of powdered boric acid per 100 lbs. of sodium silicate. For practical purposes I find that from four to six percent of boric acid on the weight of the sodium silicate is both economical and effective, yet it will be evident that slight departures from my maximum and minimum amounts may be used without departing from the spirit of my invention.

Although I have illustrated with a sodium silicate solution of approximately 40% solids, in which sodium oxide and silicon dioxide are present in the ratio of approximately 1:3.25, it will be evident that solutions of other solids content, such as 35% solids or less up to 42% solids or slightly more, wherein the solids may consist of sodium oxide and silicon dioxide in ratios ranging from 1:3.0 up to 1:4.0, may be used without departing from the spirit of my invention.

In the examples I have used chrome oxide as the color principle. I do not wish to restrict myself to the use of any specific color principle, nor to any particular amount of color principle, since a wide range and variety of color imparting materials may be used alone or in combinations, including ultramarines, metal oxides and other compounds, themselves stable colors or capable of being converted into colored oxides or stable forms of colored materials under the coating and/or heating treatment, etc.

The decreased solubility of coatings on granules produced by my process as compared to silicate coatings prepared under the same conditions (same base, same mixing time, same heating operation, etc.) indicates that the coating produced by my process is not merely a silicate coating. Boric acid is a water soluble substance, and I find that extraction in distilled water for twelve hours at 175° F. or higher, will dissolve a relatively large quantity of it. Silicate granules likewise show a distinct solubility during twelve hours extraction, depending upon the temperature at which they have been previously heat treated, and the fact that granules prepared by my process show decreased total extractible soluble salts, indicate that my process produces a coating in which the sodium (or $Na_2O$) is more firmly held than in silicate coatings. This is borne out also by the greater resistance to bloom of my coatings.

Disregarding solution of, or chemical reaction with coloring agents, my process results in "sodium-boro-silicate" coatings on the granules; hence, I refer to the product as "boro-silicate granules." Borax, silica and chrome oxide or other coloring matter will give a satisfactory sodium-boro-silicate coating only if heated to a relatively high temperature, above approximately 1300° F. My coating having the above desired qualities can be produced at any temperature above 600° F., or with certain bases, even lower. This results in great fuel economy and a much wider choice of granular base. Also coating materials consisting of silica, chrome oxide, boric acid or boric oxide and sodium hydroxide or sodium carbonate would produce a sodium-boro-silicate coating only if heated to 1300 F. or higher.

What I claim is:

1. The process of coating granules of refractory material comprising the following steps: mixing together sodium silicate and chrome oxide to produce a roughly dispersed paint, mixing together the paint, the granules and powdered boric acid, and heating the coated granules.

2. The process of coating granules of refractory material comprising the following steps: mixing the granules, sodium silicate and coloring matter together uniformly to coat the granules, then applying to the wet coating on the surfaces of the granules dry, powdered boric acid, and finally heating the granules.

3. The process of coating granules of refractory material comprising the following steps, mixing the granules and sodium silicate together uniformly to coat the granules, mixing with the coated granules dry, powdered boric acid, and heating the granules.

4. The process of coating granules of refractory material comprising the following steps: uniformly coating the granules with sodium silicate and pigment, mixing the coated granules with dry, powdered boric acid, and heating the granules.

5. The process of coating granules of refractory material comprising the following steps: coating the granules with pigmented sodium silicate, mixing the coated granules with dry, powdered boric acid, and heating the granules.

6. The process defined in claim 5 and in which the relationship between the ingredients is as follows, expressed in per cent by weight: $B_2O_3$ 4.23–14.10%, $Na_2O$ 24%, $SiO_2$ 76% or approximately 3–10 lbs. of powdered boric acid per 100 lbs. of sodium silicate.

7. The process defined in claim 5 and in which the weight of the powdered boric acid is less than 10% of the weight of the sodium silicate.

8. The process defined in claim 5 and in which the weight of the powdered boric acid is 3–4% of the weight of the sodium silicate.

CARL E. HILLERS.